US009566908B2

(12) United States Patent
Croteau et al.

(10) Patent No.: US 9,566,908 B2
(45) Date of Patent: Feb. 14, 2017

(54) CONTEXT-AWARE COLLISION DEVICES AND COLLISION AVOIDANCE SYSTEM COMPRISING THE SAME

(71) Applicant: Newtrax Holdings Inc., Montreal (CA)

(72) Inventors: Serge Croteau, Laval (CA); Alexandre Buist, Boucherville (CA); Alexandre Cervinka, Verdun (CA)

(73) Assignee: Newtrax Hodlings inc, Montréal, Québec (CA)

( * ) Notice: Subject to any disclaimer, the term of this patent is extended or adjusted under 35 U.S.C. 154(b) by 0 days.

(21) Appl. No.: 14/435,418

(22) PCT Filed: Oct. 11, 2013

(86) PCT No.: PCT/CA2013/000885
§ 371 (c)(1),
(2) Date: Apr. 13, 2015

(87) PCT Pub. No.: WO2014/056099
PCT Pub. Date: Apr. 17, 2014

(65) Prior Publication Data
US 2015/0274072 A1    Oct. 1, 2015

Related U.S. Application Data

(60) Provisional application No. 61/713,019, filed on Oct. 12, 2012, provisional application No. 61/726,304, (Continued)

(51) Int. Cl.
*B60Q 9/00* (2006.01)
*E21F 11/00* (2006.01)
(Continued)

(52) U.S. Cl.
CPC .............. *B60Q 9/008* (2013.01); *B60W 30/08* (2013.01); *E21F 11/00* (2013.01); *G08G 1/162* (2013.01); *G08G 1/166* (2013.01)

(58) Field of Classification Search
CPC ........ B60Q 9/008; G08G 1/166; G08G 1/162; B60W 30/08; F21F 11/00
See application file for complete search history.

(56) References Cited

U.S. PATENT DOCUMENTS

2011/0249118 A1* 10/2011 Bruno ............... B60W 30/0953
348/148

* cited by examiner

*Primary Examiner* — Ted Wang
(74) *Attorney, Agent, or Firm* — Brouillette and Partners; Robert Brouillette

(57) ABSTRACT

Personnel and vehicle collision avoidance devices configured to be used in collision avoidance systems are disclosed. The collision avoidance devices are configured to be aware of the context (e.g. position, location, state, status, etc.) in which the person or vehicle is. This awareness allows the devices to avoid transmitting non-hazardous proximity warnings when the context does not warrant the transmission of proximity warnings, and to transmit special critical proximity warnings when the context warrants the transmission of such proximity warnings. To detect the context, the devices comprise one or more context-awareness mechanisms (e.g. user input interfaces, sensors, infra-red receivers, etc.), each of which being capable of detecting one or more particular contexts. A collision avoidance system comprising these personnel and vehicle collision avoidance devices is also presented.

30 Claims, 5 Drawing Sheets

Related U.S. Application Data filed on Nov. 14, 2012, provisional application No. 61/767,409, filed on Feb. 21, 2013.

(51) Int. Cl.
    *G08G 1/16*     (2006.01)
    *B60W 30/08*     (2012.01)

CONTEXT-AWARE COLLISION DEVICES AND COLLISION AVOIDANCE SYSTEM COMPRISING THE SAME

CROSS-REFERENCE TO RELATED APPLICATIONS

The present patent application claims the benefits of priority of U.S. Provisional Patent Application No. 61/713,019, entitled "System and Method for Reducing Non-Hazardous Proximity Warnings in Collision Avoidance Systems", and filed at the United States Patent and Trademark Office on Oct. 12, 2012; of U.S. Provisional Patent Application No. 61/726,304, entitled "Proximity Warning System P.W.S. Use Cases", and filed at the United States Patent and Trademark Office on Nov. 14, 2012; and of U.S. Provisional Patent Application No. 61/767,409, entitled "Proximity Warning System", and filed at the United States Patent and Trademark Office on Feb. 21, 2013, the content of all three documents is incorporated herein by reference.

FIELD OF THE INVENTION

The present invention generally relates to the field of safety devices, apparatuses and/or systems and more particularly to the field of proximity warning and collision avoidance devices, apparatuses and/or systems typically used in mining environments.

BACKGROUND OF THE INVENTION

Numerous underground mines are developed and are in operation throughout the world. Though safety measures are typically deployed to prevent accidents involving collisions between vehicles, machines, personnel and/or obstacles in these mines, accidents unfortunately happen on a regular basis.

To minimize the risks of collisions, collision avoidance systems are increasingly deployed. These systems come in various configurations and use various technologies, all with their inherent advantages and drawbacks.

One type of collision avoidance systems that is becoming popular in underground mine environments involves the use of typically three types of collision avoidance devices configured to be respectively mounted to vehicles, personnel, and obstacles. These devices are configured to form ad hoc peer-to-peer wireless networks when they are within communication range of each other and can therefore transmit proximity warnings to each other if proximity is detected from various sensors based on received signal strength, time-of-flight, radar, lasers or magnetic fields.

However, even if these types of collision avoidance systems can provide valuable warnings to enhance safety at mine sites, it remains that these systems do not take into account the context in which the person or the vehicle carrying the device is before transmitting proximity warnings. Hence, these systems often cause the transmission of proximity warnings even though the context does not warrant it.

Non-limitative examples of non-hazardous proximity warnings include the notification to a vehicle operator of personnel in the area when personnel are passengers in the same or another vehicle, the notification to a vehicle operator of personnel in the area when personnel are in a refuge or other sheltered area, the notification to a vehicle operator of vehicles in the area when the vehicles are parked in a garage, and the notification to personnel of a vehicle in the area when the vehicle is stopped or non-operating.

Unfortunately, current collision avoidance systems have a very limited ability to distinguish between non-hazardous situations, hazardous situations, and very hazardous or critical situations, and therefore often issue proximity warnings in all these situations.

Understandably, the transmission of proximity warnings for non-hazardous situations causes problems. For example, vehicle operators bombarded by undistinguished proximity warnings will be unable to distinguish between very hazardous, hazardous and non-hazardous situations and will tend to ignore most warnings, thereby causing preventable accidents.

Hence, in view of the foregoing, there is a need for an improved collision avoidance system, and related devices and methods, purpose-built for underground mines which will at least mitigate some of the shortcomings of systems using collision avoidance devices.

SUMMARY OF THE INVENTION

Some of the shortcomings of prior art collision avoidance systems using various personnel, vehicle and obstacle devices are at least mitigated by a collision avoidance system in which the personnel devices and the vehicle devices are configured to be aware of the particular context in which they are such as to control the transmission of proximity warnings.

In accordance with the principles of the present invention, the personnel and vehicle devices are generally configured to detect the context (e.g. position, location, state, status, etc.) in which the person or vehicle is such as to modulate the transmission of proximity warnings based on the detected context.

In that sense, when the personnel or vehicle device detects that the person or vehicle is in a non-hazardous situation which does not warrant the transmission of a proximity warning, the device does not transmit proximity warnings. However, when the personnel or vehicle device detects that the person or vehicle is in a very hazardous or critical situation, the device transmits special critical proximity warnings to all vehicle operators in range, which triggers a special type of notification.

In some embodiments, the critical proximity warnings could be capable of stopping every vehicles which receive the critical proximity warnings. However, in most underground mines, remotely stopping all vehicles in range without the consent of the vehicle operators would be a significant safety hazard since stopping the vehicle abruptly or in a high-risk area would often put the vehicle operator at risk. This is why in typical embodiments, critical proximity warnings only trigger a special type of urgent notification.

The devices in accordance with the principles of the present invention are generally used within collision avoidance systems comprising, in addition to personnel devices worn by personnel and vehicle devices mounted to vehicles and machinery, obstacle devices which are configured to be mounted to obstacles and other fixed hazards.

The devices of such collision avoidance systems are typically able to communicate via an ad hoc peer-to-peer wireless network when they are within communication range of each other to minimize latency, or via a wireless LAN, and to transmit proximity warnings depending of the types of devices.

In the case of collision avoidance systems based on ad hoc peer-to-peer networks, only certain connections are generally allowed between devices in order, for instance, to accelerate ad hoc network forming. For instance, since another vehicle, an obstacle, and a person on foot can all be hazardous to a vehicle operator, vehicle devices can establish connections with all three types of devices. However, since only vehicles are hazardous to personnel on foot, personnel devices can only establish connections with vehicle devices. Understandably, since other personnel and obstacles are typically not hazardous to personnel on foot, personnel devices will not typically establish connections with other personnel devices and obstacle devices.

In the case of collision avoidance systems based on a wireless LAN, communications rely on an infrastructure network which must provide blanket coverage in the area(s) of interest. All connections are established via the infrastructure network (e.g. wireless LAN).

In typical yet non-limitative embodiments, the personnel and vehicle collision avoidance devices generally comprise at least one but typically several context awareness mechanisms (e.g. interfaces, sensors, systems, infra-red receivers, buttons, etc.) connected to a control module or processing unit (e.g. a central processing unit, a microcontroller). These context awareness mechanisms monitor and collect various context-related data which are then transmitted to the processing unit for analysis.

The processing unit, using the received data and various decision algorithms, then determines whether the person or vehicle is in a context (e.g. position, location, state, status, etc.) that does not warrant the transmission of a proximity warning, or that warrants the transmission of a critical proximity warning.

On the one hand, if the processing unit of the collision avoidance device determines that the person or vehicle is in a non-hazardous situation, it will generally temporarily turn off or disable the transmission of proximity warnings for as long as it is determined that the person or vehicle is in the non-hazardous situation.

On the other hand, if the processing unit of the collision avoidance device determines that the person or vehicle is in a very hazardous situation, it will generally transmit a special type of proximity warnings, i.e. critical proximity warnings. In typical though non-limitative embodiments, these critical proximity warnings will trigger a special type of urgent notification to vehicle operators in range.

However, if the processing unit determines that the context is neither non-hazardous nor critical, it will cause the transmission of a regular proximity warning.

In a first exemplary yet non-limitative implementation, the personnel device will temporarily disable the transmission of proximity warnings if the person wearing the device is in a safe zone sheltered from vehicle traffic (e.g. a lunch room, an electrical substation, etc.). In such implementation, the personnel device will comprise, as a context awareness mechanism, a receiver, typically an infra-red receiver embedded in the personnel device, for detecting whether the person is in the safe zone. This first implementation will typically prevent the transmission of a proximity warning to an incoming vehicle since the person wearing the device is in a non-hazardous location.

In a second exemplary yet non-limitative implementation, the personnel device will temporarily disable the transmission of proximity warnings while the person wearing the device is seated or in a seated position, since workers typically do not sit in the way of vehicle traffic. In such implementation, the device will comprise, as a context awareness mechanism, a sensor, typically a pressure sensor located in the footwear of the person or in the seat of a vehicle, in communication with the personnel device, for transmitting pressure information indicative of the sitting or standing position of the person. This second implementation will typically prevent the transmission of a proximity warning to a vehicle when the person wearing the device is actually sitting in the vehicle or in a passing vehicle. Understandably, a person sitting in a vehicle poses no collision hazard to the vehicle he is in or to another incoming vehicle.

In a third exemplary yet non-limitative implementation, the vehicle device will detect if the vehicle is parked, and therefore has its lights off, and increase the level of the transmitted proximity warnings to critical, to ensure that vehicle operators do not assume there is no vehicle in close proximity because they cannot see any lights. In such implementation, the device will comprise, as a context awareness mechanism, a sensor, typically an ignition on/off sensor, an oil pressure switch, an interface with the vehicle data bus or a movement detector (e.g. a MEMS inertial sensor), in communication with the vehicle device, to determine if the vehicle is parked. This third implementation will typically increase the level of proximity warnings to other vehicles and eliminate any proximity warning to personnel devices, if applicable.

In a fourth exemplary yet non-limitative implementation, the vehicle device will temporarily disable the transmission of proximity warnings if the vehicle is in a safe zone sheltered from vehicle traffic (e.g. a parking, a garage, etc.). In such implementation, the device will comprise, as a context awareness mechanism, a receiver, typically an infra-red receiver, in communication with the vehicle device, for detecting whether the vehicle is in the safe zone. This fourth implementation will typically prevent the transmission of a proximity warning to an incoming vehicle since the vehicle is parked in a non-hazardous location.

In a fifth exemplary yet non-limitative implementation, the personnel device will temporarily disable the transmission of proximity warnings if the personnel device is in its charger. In such implementation, the device will comprise, as a context awareness mechanism, an electrical interface to detect if it is in its charger. This fifth implementation will typically prevent the transmission of a proximity warning to an incoming vehicle, since this means the personnel device is not worn by a person.

Understandably, several other implementations are possible and various implementations could be combined. In that sense, personnel and vehicle devices in accordance with the principles of the present invention could comprise several context awareness mechanisms to allow a more precise determination of the location, position, state and/or status of the person or vehicle.

By allowing the personnel and vehicle devices to detect the context in which the person or vehicle is, the personnel and vehicle devices are able to avoid the transmission of proximity warnings in non-hazardous situations and to cause the transmission of critical proximity warnings in highly hazardous or critical situations. By reducing the transmission of proximity warnings in non-hazardous situations and by augmenting the importance of proximity warnings in highly hazardous or critical situations, the devices in accordance with the principles of the present invention generally prevent vehicle operators and personnel from ignoring warnings which could cause preventable accidents.

Other and further aspects and advantages of the present invention will be obvious upon an understanding of the illustrative embodiments about to be described or will be indicated in the appended claims, and various advantages not referred to herein will occur to one skilled in the art upon employment of the invention in practice.

BRIEF DESCRIPTION OF THE DRAWINGS

The above and other aspects, features and advantages of the invention will become more readily apparent from the following description, reference being made to the accompanying drawings in which.

DETAILED DESCRIPTION OF THE PREFERRED EMBODIMENT

Novel context-aware collision avoidance devices and a collision avoidance system comprising the same will be described hereinafter. Although the invention is described in terms of specific illustrative embodiments, it is to be understood that the embodiments described herein are by way of example only and that the scope of the invention is not intended to be limited thereby.

The context-aware collision avoidance devices in accordance with the principles of the present invention are generally deployed within collision avoidance systems of the type comprising different types of devices configured to be respectively mounted to, or carried by, mobile vehicles and machinery, fixed hazards or obstacles, and personnel.

Typically, such collision avoidance systems comprise three types of devices, namely: 1) vehicle devices to be mounted to mobile vehicles and machinery (collectively referred to as "vehicles"), 2) obstacle devices to be mounted to obstacle and other fixed hazards (collectively referred to as "obstacles"), and 3) personnel devices to be carried by personnel (e.g. vehicle operators, workers, miners, etc.).

In operation, the various devices will communicate with each other directly (e.g. through peer-to-peer network(s)) or indirectly (e.g. through communication network(s)). Once in communication, the various devices will be able to transmit proximity warnings to each other when proximity is detected with the help of various methodologies (e.g. communication range, received signal strength, time of flight, radar, magnetic fields, laser-based location recognition, etc.).

In the present embodiment, the various devices communicate directly with each other via peer-to-peer communication. Also, in the present embodiment, proximity between devices is mainly detected by the radio-frequency communication range between various devices. In that sense, in the present embodiment, the range of proximity detection varies from as low as 25 meters when devices are around corners with no direct line-of-sight, to up to 100 meters when devices have a direct line-of-sight.

Figure 1:
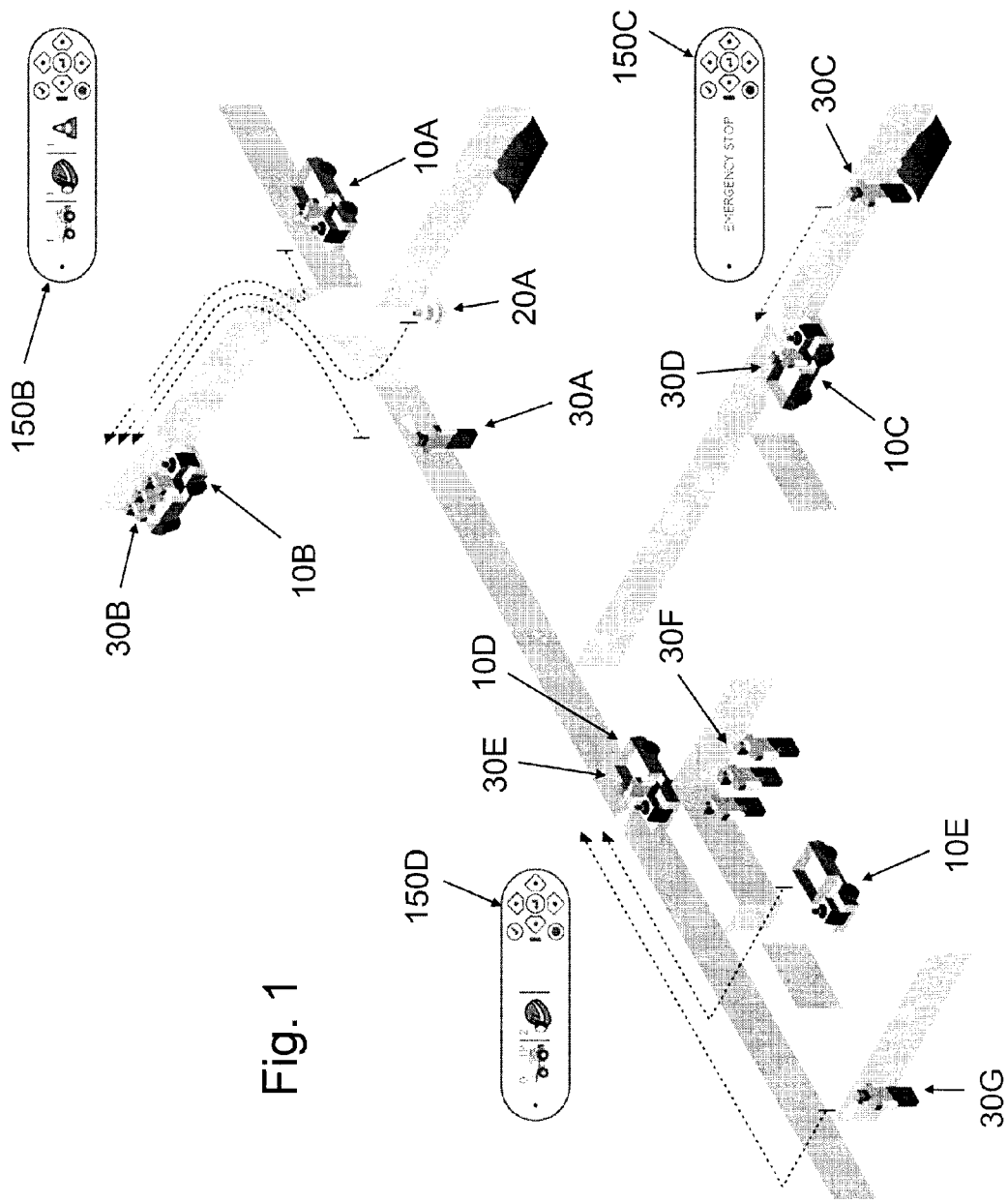
FIG. 1 is an exemplary scenario involving a collision avoidance system in accordance with the principles of the present invention.

Referring now to FIG. 1, an exemplary scenario of a collision avoidance system involving vehicles 10, obstacles 20 and personnel 30 is illustrated.

In the scenario of FIG. 1, which is located in an underground mine, there are several vehicles 10 equipped with vehicle devices 100, one obstacle 20 provided with an obstacle device 200, and several workers 30 equipped with personnel devices 300, all of them being in various contexts.

Starting with vehicle 10B, its vehicle device 100 establishes peer-to-peer connections with the devices of vehicle 10A, of obstacle 20A, and of worker 30A, and receives proximity warnings from all of them. Consequently, the display 150B of the vehicle device 100 indicates the presence of vehicle 10A, obstacle 20A, and worker 30A, thereby warning the operator of their proximity.

Notably, as it will be best understood below, since the workers 30B seated in the vehicle 10B all have their respective cap lamps 400 turned off, their respective personnel devices 300 do not establish peer-to-peer connection with the vehicle device 100 of vehicle 10B. Hence, the vehicle device 100 of vehicle 10B does not receive proximity warnings from the personnel devices 300 of workers 30B and does not count them. Understandably, workers seated in a vehicle do not pose any collision risks with the vehicle.

Also, though not shown in FIG. 1 for clarity purposes, the personnel device 300 of worker 30A would also receive proximity warnings from the vehicle devices 100 of both vehicles 10A and 10B. Similarly, the vehicle device 100 of vehicle 10A would receive proximity warnings from the vehicle device 100 of vehicle 10B, from the obstacle device 200 of obstacle 20A, and from the personnel device 300 of worker 30A. However, for the same reason as the vehicle device 100 of vehicle 10B, the vehicle device 100 of vehicle 10A would not receive proximity warnings from the personnel devices of workers 30B because their cap lamps 400 are turned off.

Notably, since the obstacle 20A would not pose a risk of collision to the worker 30A, there would be no peer-to-peer communication between the devices of obstacle 20A and of worker 30A.

Referring now to vehicle 10D, its vehicle device 100 establishes peer-to-peer connections with the vehicle device 100 of parked vehicle 10E, which is located in a garage area, and with personnel device 300 of worker 30G, and receives proximity warnings from them. Notably though, since vehicle 10E is parked, this status is specially indicated on the display 150D of the vehicle device 100 of vehicle 10D (e.g. with a parked vehicle icon or identifier). Hence, the operator 30E of the vehicle 10D is being made aware of the presence of a vehicle 10 but since the vehicle is parked, the risk of collision is significantly higher because the vehicle head lights are turned off and the vehicle is therefore harder to see in the ambient darkness of the underground mine.

Notably, the vehicle device 100 of vehicle 10D does not establish peer-to-peer connections with the personnel devices 300 of workers 30F since they are located in the garage area with their cap lamp 400 turned off. In other words, since workers 30F do not pose any immediate collision hazard to the vehicle 10D, they do not transmit proximity warnings to the vehicle 10D.

Finally, referring to worker 30C, since he is afraid of being run over by vehicle 10C moving toward him, he triggers the transmission of a critical proximity warning to the vehicle device 100 of vehicle 10C. In such circumstances, the display 150C of the vehicle device 100 would warn the operator 30D to stop immediately via a special notification.

In the embodiment of FIG. 1, peer-to-peer connections between personnel vehicle devices 100, obstacle devices 200 and personnel devices 300 are shown in dotted lines. Notably, as mentioned above, only the vehicle devices 100, obstacle devices 200 and personnel devices 300 which are in communication range with another vehicle device 100, and vehicle devices 100 which are in communication range with personnel devices 300 actually establish a peer-to-peer connections. Devices which are not in communication range do not establish peer-to-peer connections. In the present embodiment, the communication range of the devices generally correspond to the danger zone around the vehicle, obstacle or personnel in which proximity warning should be transmitted. In other embodiments, the danger zone or area around vehicle, obstacle and personnel could be determined via other mechanisms (e.g. received signal strength, time-of-flight, radar, lasers or magnetic fields, etc.).

In accordance with the principles of the present invention, the vehicle device 100 and the personnel device 300 are each provided with context awareness mechanisms which allows the vehicle device 100 and the personnel device 300 to temporarily disable the transmission of proximity warnings when it is determined that the vehicle or the person is in a non-hazardous situation or context (e.g. location, position, state, status, etc.) that does not warrant the transmission of proximity warnings, and to transmit critical proximity warnings when it is determined that the vehicle or the person is in highly hazardous or critical situation or context (e.g. location, position, state, status, etc.) that warrants the transmission of the critical proximity warnings.

Vehicle Device

Figure 2:
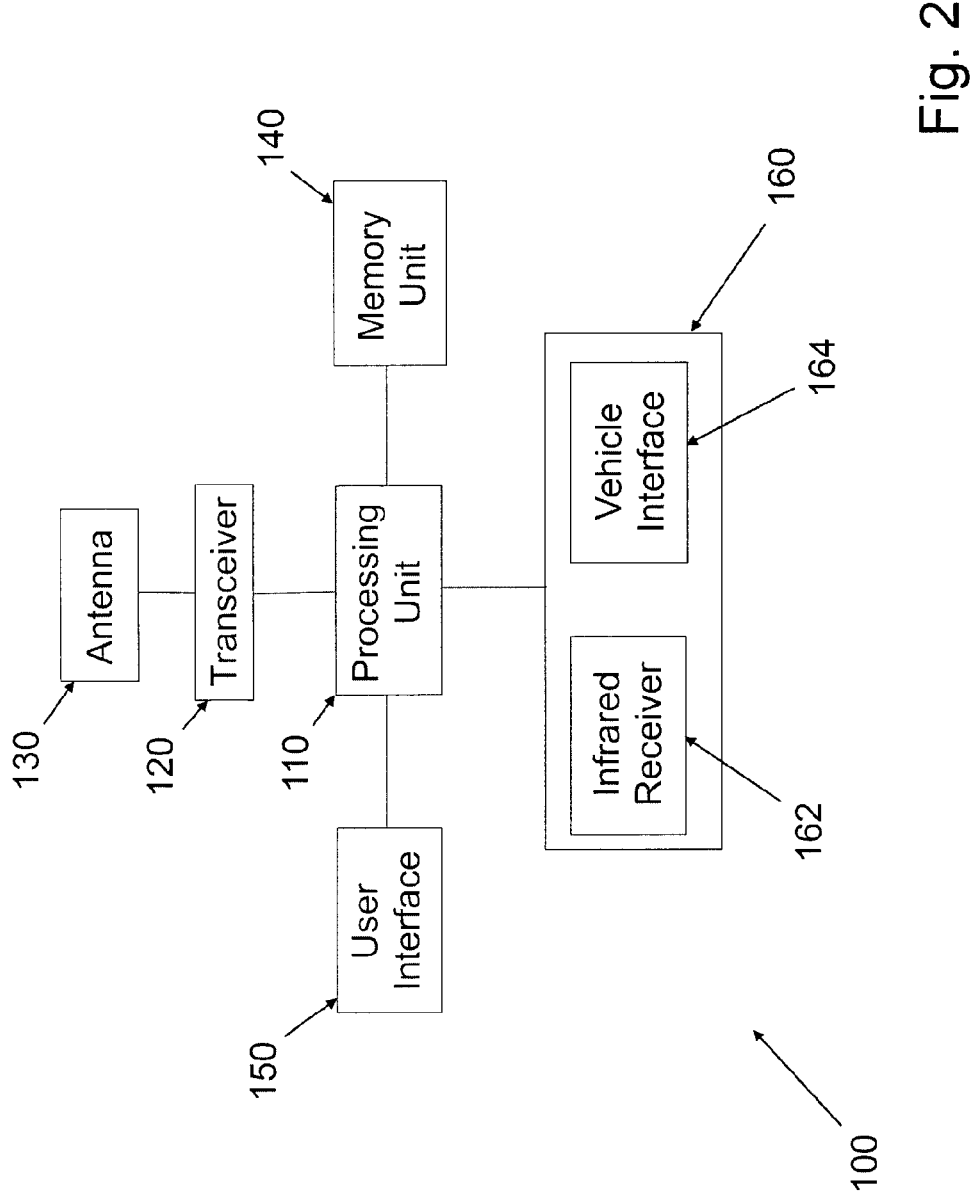
FIG. 2 is a schematic diagram of an embodiment of a vehicle device in accordance with the principles of the present invention.

Referring to FIG. 2, an embodiment of a vehicle device 100 in accordance with the principles of the present invention is illustrated.

The vehicle device 100 typically comprises a processing unit 110 (e.g. a central processing unit, a microcontroller, a control module, etc.), a transceiver 120 connected to the processing unit 110 for communicating with other devices and for receiving and transmitting proximity warnings and other information via an omnidirectional antenna 130 connected thereto, a memory unit 140 connected to the processing unit 110 for storing programs, instructions, information and/or data relevant to the proper functioning of the device 100, a user interface 150 connected to the processing unit 110, and at least one context awareness mechanism 160.

Figure 3:
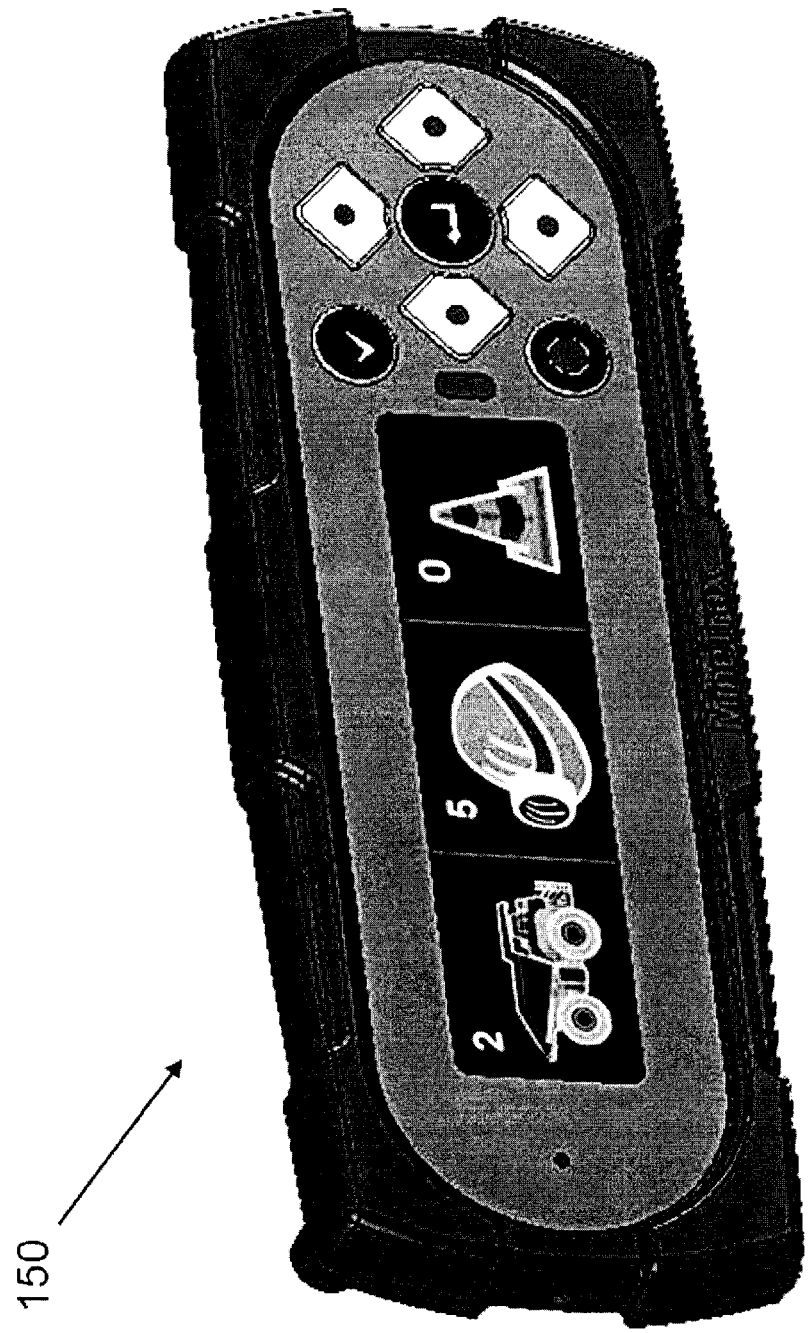
FIG. 3 is a perspective view of an exemplary embodiment of a user interface of the vehicle device in accordance with the principles of the present invention.

In the present embodiment, as best shown in FIG. 3, the user interface 150 typically comprises a display screen and one or more buttons, or a touch screen, and speaker(s) (e.g. buzzers) for notifying the operator 30 of the vehicle 10 to which the vehicle device 100 is mounted.

In the present embodiment, the device 100 comprises two context awareness mechanisms 160. One mechanism is configured to reduce non-hazardous proximity warnings, and the other mechanism is configured to cause the transmission of critical proximity warnings. Understandably, in other embodiments, the context awareness mechanisms 160 could comprise more or less than two different mechanisms and/or could use mechanisms different from the ones about to be described. In that sense, various mine settings and configurations may warrant the use of additional and/or different mechanisms.

Reduction of Non-Hazardous Proximity Warnings

The context awareness mechanism to reduce the transmission of proximity warnings is an infra-red receiver 162 mounted to the vehicle 10, typically on its top, and configured to detect coded IR signals transmitted by IR transmitters properly deployed in the mine to delimitate safe zones such as garages, safe parking areas, etc.

When a vehicle 10 enters such a safe zone provided with an appropriate IR transmitter (not shown), the receiver 162 will pick up the coded IR signals and forward the relevant information to the processing unit 110 which will disable the transmission of proximity warnings to other vehicles and to personnel.

Hence, vehicles 10 and personnel 30 passing near such safe zones will not receive proximity warnings from vehicle devices 100 of vehicles 10 located in these safe zones as these vehicles 10 do not pose any collision hazard to the vehicles 10 and personnel 30 in the mine.

In the present embodiment, to delimit the boundaries of a safe zone, which can end as abruptly as when a vehicle moves outside of a garage into a tunnel with vehicle traffic, the use of IR signals is preferred over RF signals since well-defined demarcation lines can be created by confining IR signal with simple optically opaque materials (e.g. plywood boards, opaque polymeric curtains, etc.). RF signals tend to be more pervasive in nature and therefore more difficult to control or interpret.

Transmission of Critical Proximity Warnings

The context-awareness mechanism 164 is a vehicle interface configured to determine whether the vehicle 10 is parked. This mechanism 164 is configured to cause the processing unit 110 to transmit critical proximity warnings to other vehicles 10 when the processing unit 110 detects, via the vehicle interface 164, that the lights of the vehicle 10 are turned off. Understandably, in an underground mine, a running vehicle 10 always has its lights on. Hence, if the lights of the vehicle 10 are turned off, it generally means that the vehicle is parked and not running. Understandably, the vehicle interface 164 could detect that the vehicle 10 is not running via other indicators (e.g. ignition switch, oil pressure, etc.).

Understandably, a vehicle 10 parked in a tunnel with its lights turned off could pose a very high risk of collision with an incoming vehicle 10. Indeed, a vehicle with its lights turned off become a large yet hard-to-see obstacle partially or completely blocking a tunnel.

Hence, when a vehicle device 100 receives such a critical proximity warning, a special notification (e.g. a parked vehicle icon as in FIG. 1) is generally indicated on the display of the user interface 150.

Understandably, the processing unit 110 is generally configured to manage conflicting information coming from the various context-awareness mechanisms 160.

For instance, in the present embodiment of the vehicle device 100, if the vehicle 10 is parked in a safe parking area with its lights turned off, the processing unit 110 will receive conflicting information from the two context-awareness mechanisms 162 and 164. Indeed, the IR receiver 162 will detect coded IR signals from the IR transmitter located in the safe parking area, indicating that no proximity warnings should be sent, while the vehicle interface 164 will detect that the lights of the vehicle 10 are turned off, indicating that critical proximity warnings should be sent.

In this case, the processing unit 110 would be configured such that the detection of coded IR signals overrides the detection of turned off lights. Indeed, if the vehicle 10 is parked in a safe area, the device 100 of such vehicle 10 should not send critical proximity warnings to nearby vehicles 10.

Understandably, depending on the actual context-awareness mechanisms 160 used and on the contexts they are configured to determine, the processing unit 110 would be configured to perform conditional logic operations and/or other operations to determine what is the primary detected context upon which the decision to not transmit proximity warnings, to transmit proximity warnings, or to transmit critical proximity warnings should be based.

Personnel Device

Figure 4:
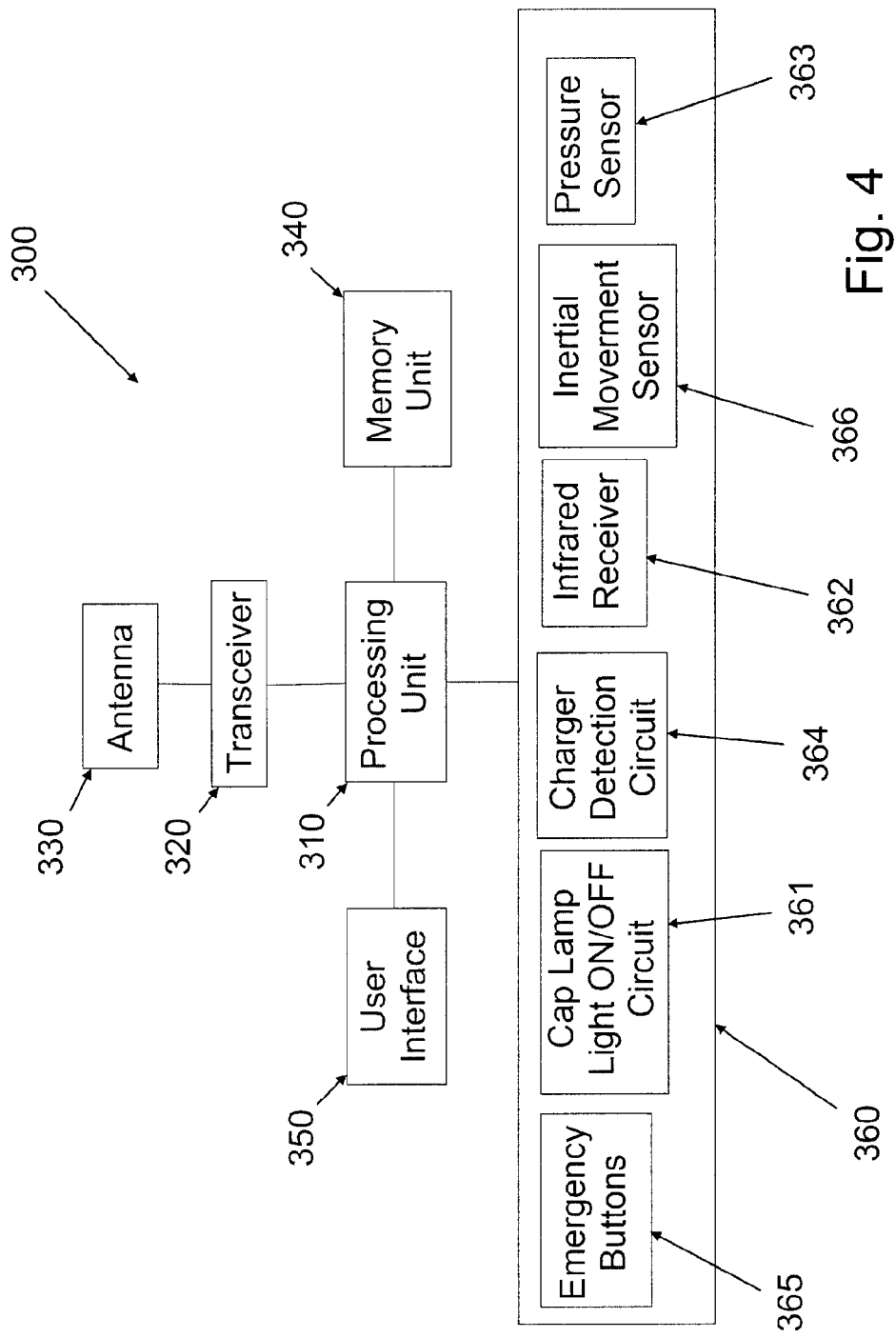
FIG. 4 is a schematic diagram of an embodiment of a personnel device in accordance with the principles of the present invention.

Referring to FIG. 4, an embodiment of a personnel device 300 in accordance with the principles of the present invention is illustrated.

The personnel device 300 typically comprises a processing unit 310 (e.g. a central processing unit, a microcontroller, a control module, etc.), a transceiver 320 connected to the processing unit 310 for communicating with other devices and for receiving and transmitting proximity warnings and other information via an omnidirectional antenna 330 connected thereto, a memory unit 340 connected to the processing unit 310 for storing programs, instructions, information and/or data relevant to the proper functioning of the device 300, a user interface 350 connected to the processing unit 310, and at least one context awareness mechanism 360.

In the present embodiment, the personnel device 300 is integrated into the cap lamp 400 (see FIG. 5) for the following reasons:

a. Collision avoidance systems will actually increase the risk of collisions if some of the workers 30 do not have personnel devices 300 on them. Since nobody forgets their cap lamp when going underground (without a cap lamp, one cannot see anything), integration of the personnel device 300 with the cap lamp 400 is the most reliable means of ensuring all workers have a personnel device 300 on them.

b. Using the cap lamp OFF status as a means of determining if the person is not at risk of collision, since the light is always on in high-risk areas, whereas it is often turned off when the person is operating a vehicle, is a passenger, or is in a well-lit sheltered area like the lunch room, refuge or electrical sub-station.

c. Using the cap lamp ON status as a necessary condition to trigger a man-down alarm, as detected by an embedded motion sensor, since workers will typically turn off their cap lamps 400 (via switch or button 410) when they take them off during a break and leave them immobile on a hook or table.

d. Using the cap lamp 400 in charger as a means of determining the device 300 is not worn by a person.

e. Using the cap lamp head light mounting location on the helmet, to position the embedded infra-red receiver with a line-of-sight view of any infrared transmitter used to flood a safe zone with reference IR signals, whose propagation is blocked by any opaque material, including clothes.

f. Ability to flash the head light, to notify the person of a critical proximity warning, if required, since this is the most reliable means of getting the person's attention g. Quick access to emergency buttons in case of panic, since buttons on cap lamp head light are always accessible and at the exact same location, unlike a device mounted on the belt, a necklace or in a pocket.

h. Ability to use cycling of power on cap lamp 400, an existing interface familiar to personnel, to reset emergency stop alarms.

In the present embodiment, the context awareness mechanism 360 comprises six different mechanisms.

The first four mechanisms are related to the reduction of non-hazardous proximity warnings. The other two mechanisms are related to the transmission of critical proximity warnings. Understandably, in other embodiments, the context awareness mechanism 360 could comprise more or less than six different mechanisms and/or could use mechanisms different from the ones about to be described. In that sense, various mine settings and configurations may warrant the use of additional and/or different mechanisms.

Reduction of Non-Hazardous Proximity Warnings

The first mechanism 361 to reduce the transmission of non-hazardous proximity warnings is an interface between the processing unit 300 and the cap lamp controller (not shown). This mechanism 361 is configured to detect whether the cap lamp is turned on or off.

If the mechanism 361 detects that the cap light is turned off, the mechanism 361 will transmit the information to the processing unit 310 which, in turn, will disable the transmission of proximity warnings for as long at the cap lamp 400 is determined to be turned off.

Understandably, if the cap lamp 400 is turned off, it generally means that either the cap lamp 400 itself is not in use, or that the person 30 wearing the cap lamp 400 is in a well-lit or safe area. In any of these cases, the personnel device 300 should not transmit proximity warnings as no personnel is in a hazardous situation.

The second mechanism 362 for reducing non-hazardous proximity warnings is an infra-red ("IR") receiver in communication with the processing unit 310.

Figure 5:
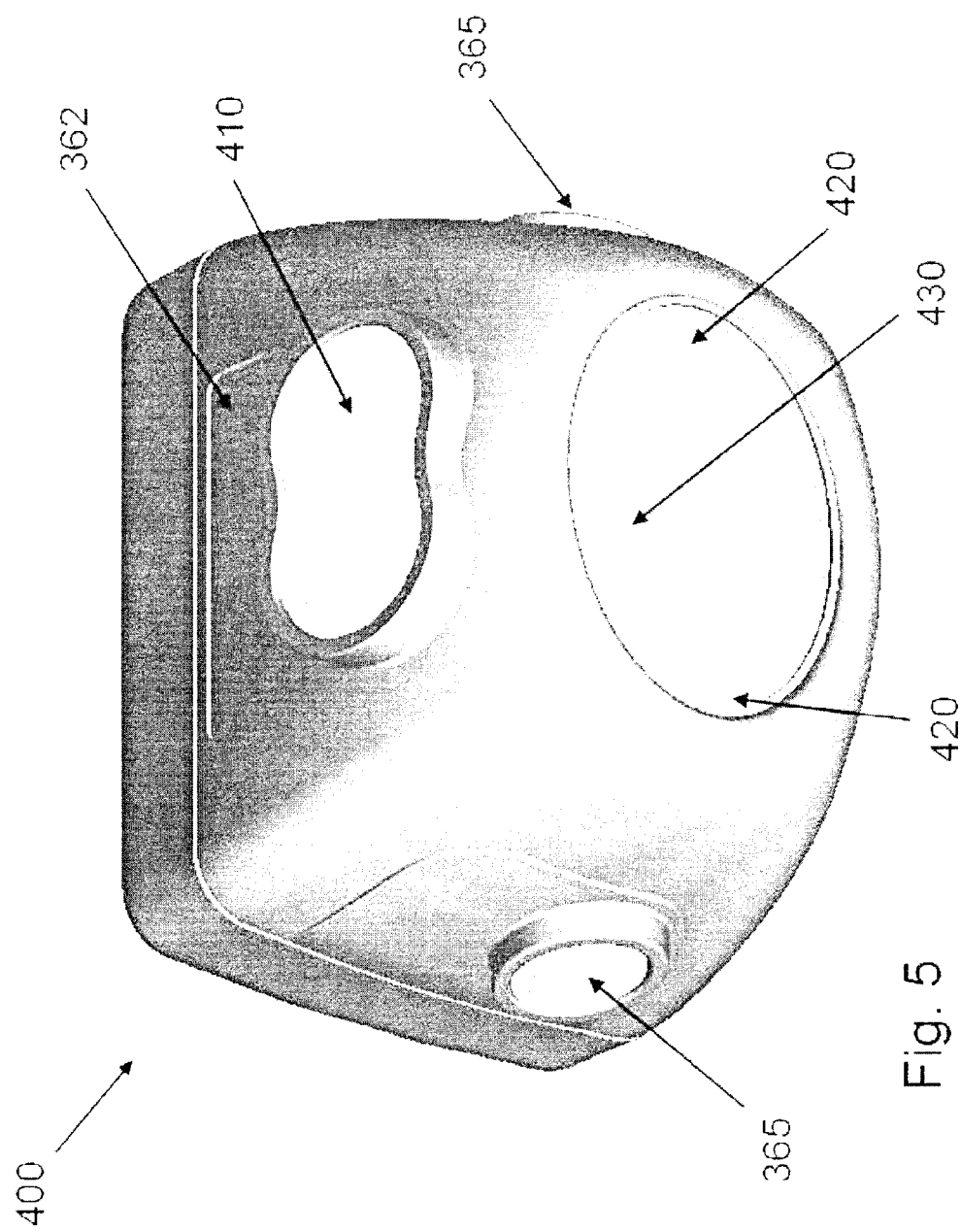
FIG. 5 is a perspective view of an exemplary embodiment of a personnel device in accordance with the principles of the present invention, the personnel device being integrated to a cap lamp.

In the present embodiment, the receiver 362 is mounted to, or integrated with, the cap lamp 400 (see FIG. 5). This receiver 362 is configured to receive coded IR signals from IR transmitters (not shown) properly deployed in the mine to delimitate safe zones such as lunch areas, electrical substations, shelters, etc.

As a person 30 wearing his cap lamp 400 enters a safe zone, such as a lunch area or an electrical substation, provided with an appropriate IR transmitter (not shown), the receiver 362 will pick up the coded IR signals and the processing unit 310 will disable the transmission of proximity warnings.

Hence, vehicles 10 passing near such safe zones will not receive proximity warnings from the personnel devices 300 of the persons 30 located in these safe zones as these persons 30 do not pose any collision hazard to the vehicles 10.

To define the boundaries of a safe zone, which can end as abruptly as when a person 30 takes a step outside of a refuge into the tunnel with vehicle traffic, the use of IR signals is preferred over RF signals since well-defined demarcation lines can be created by confining IR signals with simple optically opaque materials (e.g. plywood boards, opaque polymeric curtains, etc.). RF signals tend to be more pervasive in nature and therefore more difficult to control or interpret.

The third mechanism 363 to reduce the transmission of non-hazardous proximity warnings is a pressure sensor mounted in the footwear of the person 30 carrying the device 300 and typically in wireless communication with the processing unit 310.

The pressure sensor 363 measures the amount of pressure actually applied thereon at regular intervals and transmits the collected data to the processing unit 310.

Upon receiving the pressure data, the processing unit 310 will compare them to predetermined ranges and will determine whether the person 30 carrying the device 300 is sitting or standing.

If the processing unit 310 determines that the person is sitting, then the processing unit 300 will disable the transmission of proximity warnings for as long as the person is determined to be sitting.

Understandably, a person 30 that is sitting in the vicinity of a vehicle is likely to be the operator of the vehicle, a passenger in the vehicle, or the operator or a passenger of a nearby passing vehicle. In all these situations, the person will be in a vehicle and will therefore pose no risk of collision with another vehicle. In any event, personnel 30 in underground mines never sit in areas where vehicles 10 travel.

Alternatively, to better control which sitting scenarios should turn off the proximity warning signals, pressure sensors could be installed in cushions placed at all the safe sitting areas and could be configured to establish short-range wireless connection with the personnel device 300 of the person 30 sitting on the cushion. Upon receiving pressure data indicative of a person 30 sitting on the cushion, the processing unit 310 of the device 300 would disable the transmission of proximity warnings for as long as the person is sitting on the cushion.

The fourth mechanism is an interface 364 to detect if the cap lamp 400 is in its charger (not shown), i.e. not currently worn by a person 30.

If the processing unit 310 receives data from the interface 364 that the cap lamp 400 is in its charger, then the processing unit 310 will disable the transmission of proximity warnings since no one is actually wearing the cap lamp 400 and thus the device 300. If no personnel 30 is wearing the device 300, then there is no danger of collision and the device 300 should not transmit proximity warnings.

Understandably, the personnel device 30 could comprise more or less mechanisms 360 to reduce non-hazardous proximity warnings. Furthermore, some mechanisms 360 could work in cooperation to provide a more precise indication of the context (e.g. position, location, state, status, etc.) in which the person 30 wearing the device 300 is.

Transmission of Critical Proximity Warnings

In the present embodiment, the first mechanism to trigger the transmission of critical proximity warnings is an emergency interface 365. In the present embodiment, as best shown in FIG. 5, the emergency interface 365 is two buttons disposed on both sides of the cap lamp 400 and which cannot be pressed simultaneously by accident to avoid false alarms. The position of the cap lamp 400 on the protective helmet allows for quick access of the two buttons of the emergency interface 365.

The emergency buttons 365 are in communication with the processing unit 310 and are configured to transmit signals to the processing unit 310 upon being simultaneously depressed.

When the processing unit 310 receives signals from the buttons 365, it causes the transmission of a critical proximity warning to all the vehicles in communication range with the device 300 (see worker 30C and vehicle 10C in FIG. 1). This critical proximity warning will warn the operator of the vehicle to stop immediately via the display of special notification (e.g. EMERGENCY STOP).

In other embodiments, this critical proximity warning could further cause all the vehicles receiving the warning to stop automatically.

Though the emergency interface 365 is primarily designed to avoid imminent collisions, it could also be used in other situations where a worker 30 needs immediate assistance.

In embodiments where the devices 100, 200 and 300 are in communication with a wireless network (e.g. wireless LAN) deployed in the mine, the transmission of a critical proximity warning could also be forwarded to a monitoring system for monitoring and analysis purposes. Understandably, a critical near-miss situation that required a person 30 to initiate the transmission of a critical proximity warning should be analyzed, when possible, to determine the cause of the near-miss situation and avoid such situations in the future.

The second mechanism to trigger the transmission of critical proximity warnings is a movement detector 366 (e.g. inertial detector) connected to the processing unit 310.

The movement detector 366 is configured to detect whether the person 30 wearing the device 300 is actually moving.

In most situations, the person 30 wearing the cap lamp 400 always moves, even slightly. Hence, this second mechanism 366 is particularly configured to detect whether a person lies unconscious because of a heart attack or heat stroke (generally referred to as a man-down situation). In that sense, if a person is immobile for more than a predetermined amount of time (e.g. 3 minutes) and if the cap lamp light 430 is turned on, the processing unit 310 will cause the transmission of a critical proximity warning. Understandably, the predetermined amount of time could be more than 3 minutes or less than 3 minutes.

This critical proximity warning could be identical to the critical proximity warning transmitted after the activation of the emergency interface 365, or it could be different. In that sense, the difference could be in the message actually displayed on the interface 150 of the vehicle device 100. For instance, the display could indicate EMERGENCY STOP—MAN-DOWN instead of only EMERGENCY STOP.

Notably, though personnel devices 300 are generally configured not to transmit proximity warnings to each other since personnel do not pose collision hazard to each other, in some embodiments, the personnel device 300 could be configured to receive critical proximity warnings transmitted by a neighboring personnel device 300 in a man-down situations. In such embodiments, when personnel device 300 transmits a critical proximity warning, every personnel 30 and vehicles 10 in the vicinity of that person 30 would be warned, at the very least for assistance purposes.

In the present embodiment, the user interface 350 of the personnel device 300 typically comprises the cap lamp light 430 and could further comprise LED(s) 420, button(s), and/or buzzer(s) for notifying the person 30 carrying the personnel device 300.

Still, in the present embodiment, since the device 300 is integrated to the cap lamp 400, the processing unit 310 is in communication with the cap lamp controller such that the cap lamp controller could receive instructions from the processing unit 310 to modulate the cap lamp light 430 (e.g. blink, flash, etc.) to warn the person 30 of the reception of a proximity warning. For evacuation notification systems, this is generally recognized as the most reliable means of getting a person's attention underground. The flashing pattern for critical proximity warnings could be different from the flashing pattern of the evacuation notification system, to enable both systems to get the person's attention with the main cap lamp light 430.

Understandably, as for the processing unit 110 of the vehicle device 100, the processing unit 310 of the personnel device 300 is generally configured to manage conflicting information coming from the various context-awareness mechanisms 360.

In that sense, depending on the actual context-awareness mechanisms 360 used and on the contexts they are configured to determine, the processing unit 310 would be configured to perform conditional logic operations and/or other operations to determine what is the primary detected context upon which the decision to not transmit proximity warnings, to transmit proximity warnings, or to transmit critical proximity warnings should be based.

Notably, though the above description has been made with particular references to a collision avoidance system involving the use of devices configured to form peer-to-peer networks, the devices in accordance with the principles of the present invention will equally work with other collision avoidance systems in which communication between the various devices is possible either directly or indirectly.

In use, the processing unit of vehicle device or of the personnel device will receive data from the context awareness mechanism(s) such as to reduce the transmission of non-hazardous proximity warnings when it is determined that the vehicle or person is in a non-hazardous situation, and to transmit critical proximity warnings when it is determined that the vehicle or person is in a highly hazardous or critical situation. However, if the processing unit determines that the context is neither non-hazardous nor critical, it will cause the transmission of a regular proximity warning.

Understandably, by disabling the transmission of proximity warnings when a vehicle or a person is not in a location, position, state and/or status that pose a risk of collision, the devices in accordance with the principles of the present invention reduce the transmission of non-hazardous proximity warnings, thereby allowing vehicle operators and personnel to focus on hazardous proximity warnings. Also, by transmitting critical proximity warnings when a vehicle or a person is in a highly hazardous or critical location, position, state and/or status, the devices in accordance with the principles of the present invention allow vehicle operators and personnel to become more aware when critical situations occur.

While illustrative and presently preferred embodiments of the invention have been described in detail hereinabove, it is to be understood that the inventive concepts may be otherwise variously embodied and employed and that the appended claims are intended to be construed to include such variations except insofar as limited by the prior art.

The invention claimed is:

1. A method to control the transmission of proximity warnings between collision avoidance devices, the collision avoidance devices comprising vehicle collision avoidance devices and personnel collision avoidance devices, the personnel collision avoidance devices being respectively integrated into cap lamps, the personnel collision avoidance devices being configured to transmit proximity warnings to vehicle collision avoidance devices in communication range, and the vehicle collision avoidance devices being configured to transmit proximity warnings to other vehicle collision avoidance devices and to personnel collision avoidance devices in communication range, the vehicle and personnel collision avoidance devices each comprising at least one context awareness mechanism, the method comprising, for each of the vehicle and personnel collision avoidance devices:
   a) detecting, with the at least one context awareness mechanism, if the device is in a non-hazardous context, in a hazardous context, or in a critically hazardous context and detecting an operating parameter of the vehicle, wherein the detected operating parameter indicates if the vehicle is moving, wherein the detection of vehicle in motion is indicative of a hazardous context, and wherein the detection of a vehicle not in motion is indicative of a non-hazardous context;
   b) as a function of the detected context, disabling the transmission of proximity warnings if the detected context is non-hazardous, transmitting proximity warnings if the detected context is hazardous, or transmitting critical proximity warnings if the detected context is critically hazardous;
   repeating steps a) and b).

2. The method as claimed in claim 1, wherein the collision avoidance devices further comprise obstacle collision avoidance devices, the obstacle collision avoidance devices being configured to transmit proximity warnings to vehicle collision avoidance devices in communication range.

3. A method to control the transmission of proximity warnings between collision avoidance devices, the collision avoidance devices comprising vehicle collision avoidance devices and personnel collision avoidance devices, the personnel collision avoidance devices being respectively integrated into cap lamps, the personnel collision avoidance devices being configured to transmit proximity warnings to vehicle collision avoidance devices in communication range, and the vehicle collision avoidance devices being configured to transmit proximity warnings to other vehicle collision avoidance devices and to personnel collision avoidance devices in communication range, the vehicle and personnel collision avoidance devices each comprising at least one context awareness mechanism, the method comprising, for each of the vehicle and personnel collision avoidance devices:
   a) detecting, with the at least one context awareness mechanism, if the device is in a non-hazardous context, in a hazardous context, or in a critically hazardous context and for personnel collision avoidance devices, detecting coded infra-red signals transmitted by infra-red transmitters, wherein the detection of coded infra-red signals is indicative of a non-hazardous context, and wherein the non-detection of coded infra-red signals is indicative of a hazardous context;
   b) as a function of the detected context, disabling the transmission of proximity warnings if the detected context is non-hazardous, transmitting proximity warnings if the detected context is hazardous, or transmitting critical proximity warnings if the detected context is critically hazardous;
   c) repeating steps a) and b).

4. The method as claimed in claim 3, wherein the collision avoidance devices further comprise obstacle collision avoidance devices, the obstacle collision avoidance devices being configured to transmit proximity warnings to vehicle collision avoidance devices in communication range.

5. A method to control the transmission of proximity warnings between collision avoidance devices, the collision avoidance devices comprising vehicle collision avoidance devices and personnel collision avoidance devices, the personnel collision avoidance devices being respectively integrated into cap lamps, the personnel collision avoidance devices being configured to transmit proximity warnings to vehicle collision avoidance devices in communication range, and the vehicle collision avoidance devices being configured to transmit proximity warnings to other vehicle collision avoidance devices and to personnel collision avoidance devices in communication range, the vehicle and personnel collision avoidance devices each comprising at least one context awareness mechanism, the method comprising, for each of the vehicle and personnel collision avoidance devices:
- a) detecting, with the at least one context awareness mechanism, if the device is in a non-hazardous context, in a hazardous context, or in a critically hazardous context and for personnel collision avoidance devices detecting an activation of a user interface configured to request an emergency stop, wherein an activation of the user interface is indicative of a critically hazardous context;
- b) as a function of the detected context, disabling the transmission of proximity warnings if the detected context is non-hazardous, transmitting proximity warnings if the detected context is hazardous, or transmitting critical proximity warnings if the detected context is critically hazardous;
- c) repeating steps a) and b).

6. The method as claimed in claim 5, wherein the collision avoidance devices further comprise obstacle collision avoidance devices, the obstacle collision avoidance devices being configured to transmit proximity warnings to vehicle collision avoidance devices in communication range.

7. A method to control the transmission of proximity warnings between collision avoidance devices, the collision avoidance devices comprising vehicle collision avoidance devices and personnel collision avoidance devices, the personnel collision avoidance devices being respectively integrated into cap lamps, the personnel collision avoidance devices being configured to transmit proximity warnings to vehicle collision avoidance devices in communication range, and the vehicle collision avoidance devices being configured to transmit proximity warnings to other vehicle collision avoidance devices and to personnel collision avoidance devices in communication range, the vehicle and personnel collision avoidance devices each comprising at least one context awareness mechanism, the method comprising, for each of the vehicle and personnel collision avoidance devices:
- a) detecting, with the at least one context awareness mechanism, if the device is in a non-hazardous context, in a hazardous context, or in a critically hazardous context and for personnel collision avoidance devices detecting a cap lamp light operating status, wherein a ON operating status is indicative of a hazardous context, and wherein a OFF operating status is indicative of a non-hazardous context;
- b) as a function of the detected context, disabling the transmission of proximity warnings if the detected context is non-hazardous, transmitting proximity warnings if the detected context is hazardous, or transmitting critical proximity warnings if the detected context is critically hazardous;
- c) repeating steps a) and b).

8. The method as claimed in claim 7, wherein the collision avoidance devices further comprise obstacle collision avoidance devices, the obstacle collision avoidance devices being configured to transmit proximity warnings to vehicle collision avoidance devices in communication range.

9. A method as claimed in claim 7, wherein the step of detecting further comprises personnel collision avoidance devices detecting movements of the person, wherein detection of movements while the operating status of the cap lamp light is ON is indicative of hazardous context, and wherein non-detection of movements for more than a predetermined period of time while the operating status of the cap lamp light is ON is indicative of a critically hazardous context.

10. A method to control the transmission of proximity warnings between collision avoidance devices, the collision avoidance devices comprising vehicle collision avoidance devices and personnel collision avoidance devices, the personnel collision avoidance devices being respectively integrated into cap lamps, the personnel collision avoidance devices being configured to transmit proximity warnings to vehicle collision avoidance devices in communication range, and the vehicle collision avoidance devices being configured to transmit proximity warnings to other vehicle collision avoidance devices and to personnel collision avoidance devices in communication range, the vehicle and personnel collision avoidance devices each comprising at least one context awareness mechanism, the method comprising, for each of the vehicle and personnel collision avoidance devices:
- a) detecting, with the at least one context awareness mechanism, if the device is in a non-hazardous context, in a hazardous context, or in a critically hazardous context and monitoring the vehicle operating status, wherein a ON operating status is indicative of a hazardous context for personnel and a OFF operating status is indicative of a non-hazardous context for personnel, wherein the ON operating status triggers a notification to personnel collision avoidance devices in range;
- b) as a function of the detected context, disabling the transmission of proximity warnings if the detected context is non-hazardous, transmitting proximity warnings if the detected context is hazardous, or transmitting critical proximity warnings if the detected context is critically hazardous;
- c) repeating steps a) and b).

11. The method as claimed in claim 10, wherein the collision avoidance devices further comprise obstacle collision avoidance devices, the obstacle collision avoidance devices being configured to transmit proximity warnings to vehicle collision avoidance devices in communication range.

12. A method as claimed in claim 10, wherein the non-hazardous context is defined by demarcation lines made of optically opaque materials preventing the transmission coded infra-red signals outside the demarcation lines.

13. The method as claimed in claim 7, wherein the step of detecting further comprises personnel collision avoidance devices detecting movements of the person, wherein non-detection of movements for more than a predetermined period of time while the operating status of the cap lamp light is ON is indicative of a critically hazardous context.

14. The method as claimed in claim 13, wherein the step of transmitting the proximity warning further comprising transmitting the critically hazardous context to all vehicle collision avoidance devices in communication range of the person.

15. The method as claimed in claim 13, wherein the step of transmitting the proximity warning further comprising transmitting the critically hazardous context to a remote monitoring system using a wireless network.

16. A collision avoidance device, the collision avoidance device being integrated into a cap lamp and comprising:
- a) a processing unit;
- b) a transceiver comprising an antenna, the transceiver being in communication with the processing unit and being capable of establishing wireless communications with other collision avoidance devices in communication range to transmit and/or receive proximity warnings;

c) a user interface in communication with the processing unit;
d) at least one context awareness mechanism in communication with the processing unit, the at least one context awareness mechanism being configured to detect a context in which the collision avoidance device is and to transmit data related to the detected context to the processing unit, the at least one context awareness mechanism comprising an infra-red receiver located on the person, the infra-red receiver being configured to detect coded infra-red signals transmitted by infra-red transmitters;

wherein the processing unit is operable to 1) disable the transmission of proximity warnings to at least some devices if the processing unit determines that the detected context is non-hazardous, 2) cause the transmission of regular proximity warnings to at least some devices if the processing unit determines that the detected context is hazardous, or 3) cause the transmission of critical proximity warnings, different from regular proximity warnings, to at least some devices if the processing unit determines that the detected context is critically hazardous.

17. A collision avoidance device, the collision avoidance device being integrated into a cap lamp and comprising:
a) a processing unit;
b) a transceiver comprising an antenna, the transceiver being in communication with the processing unit and being capable of establishing wireless communications with other collision avoidance devices in communication range to transmit and/or receive proximity warnings;
c) a user interface in communication with the processing unit;
d) at least one context awareness mechanism in communication with the processing unit, the at least one context awareness mechanism being configured to detect a context in which the collision avoidance device is and to transmit data related to the detected context to the processing unit, the at least one context awareness mechanism comprising a movement detector;

wherein the processing unit is operable to 1) disable the transmission of proximity warnings to at least some devices if the processing unit determines that the detected context is non-hazardous, 2) cause the transmission of regular proximity warnings to at least some devices if the processing unit determines that the detected context is hazardous, or 3) cause the transmission of critical proximity warnings, different from regular proximity warnings, to at least some devices if the processing unit determines that the detected context is critically hazardous.

18. A collision avoidance device, the collision avoidance device being integrated into a cap lamp and comprising:
a) a processing unit;
b) a transceiver comprising an antenna, the transceiver being in communication with the processing unit and being capable of establishing wireless communications with other collision avoidance devices in communication range to transmit and/or receive proximity warnings;
c) a user interface in communication with the processing unit;
d) at least one context awareness mechanism in communication with the processing unit, the at least one context awareness mechanism being configured to detect a context in which the collision avoidance device is and to transmit data related to the detected context to the processing unit, a user interface configured to request an emergency stop from all vehicles in proximity;

wherein the processing unit is operable to 1) disable the transmission of proximity warnings to at least some devices if the processing unit determines that the detected context is non-hazardous, 2) cause the transmission of regular proximity warnings to at least some devices if the processing unit determines that the detected context is hazardous, or 3) cause the transmission of critical proximity warnings, different from regular proximity warnings, to at least some devices if the processing unit determines that the detected context is critically hazardous.

19. A collision avoidance device, the collision avoidance device being integrated into a cap lamp and comprising:
a) a processing unit;
b) a transceiver comprising an antenna, the transceiver being in communication with the processing unit and being capable of establishing wireless communications with other collision avoidance devices in communication range to transmit and/or receive proximity warnings;
c) a user interface in communication with the processing unit;
d) at least one context awareness mechanism in communication with the processing unit, the at least one context awareness mechanism being configured to detect a context in which the collision avoidance device is and to transmit data related to the detected context to the processing unit, a cap lamp interface configured to detect an operating status of the light;

wherein the processing unit is operable to 1) disable the transmission of proximity warnings to at least some devices if the processing unit determines that the detected context is non-hazardous, 2) cause the transmission of regular proximity warnings to at least some devices if the processing unit determines that the detected context is hazardous, or 3) cause the transmission of critical proximity warnings, different from regular proximity warnings, to at least some devices if the processing unit determines that the detected context is critically hazardous.

20. A collision avoidance system comprising a plurality of collision avoidance devices mounted to vehicles and persons, the personnel collision avoidance devices being configured to transmit proximity warnings to vehicle collision avoidance devices in communication range, and the vehicle collision avoidance devices being configured to transmit proximity warnings to other vehicle collision avoidance devices and to personnel collision avoidance devices in communication range;

wherein each of the vehicle and personnel collision avoidance devices comprises at least one context awareness mechanism configured to detect a context in which the collision avoidance device is, the at least one context awareness mechanism of the vehicle collision avoidance devices comprising a vehicle interface configured to determine at least one operating parameter of the vehicle; and wherein each of the vehicle and personnel collision avoidance devices is operable to 1) disable the transmission of proximity warnings if the collision avoidance device determines that the detected context is non-hazardous, 2) cause the transmission of regular proximity warnings if the collision avoidance device determines that the detected context is hazardous, or 3) cause the transmission of critical proximity warnings, different from regular proximity warnings, if the collision avoidance device determines that the detected context is critically hazardous.

wherein the personnel collision avoidance devices are respectively integrated into cap lamps.

21. The collision avoidance system as claimed in claim 20, wherein the at least one operating parameter of the vehicle comprises the ignition status, the oil pressure status, or the operating status of the lights of the vehicle.

22. The collision avoidance system as claimed in claim 20, the collision avoidance devices being further mounted to obstacles, the obstacle collision avoidance devices being configured to transmit proximity warnings to vehicle collision avoidance devices in communication range.

23. A collision avoidance system comprising a plurality of collision avoidance devices mounted to vehicles and persons, the personnel collision avoidance devices being respectively integrated into cap lamps and being configured to transmit proximity warnings to vehicle collision avoidance devices in communication range, and the vehicle collision avoidance devices being configured to transmit proximity warnings to other vehicle collision avoidance devices and to personnel collision avoidance devices in communication range;
wherein each of the vehicle and personnel collision avoidance devices comprises at least one context awareness mechanism configured to detect a context in which the collision avoidance device is, the at least one context awareness mechanism of the personnel collision avoidance devices comprises an infra-red receiver located on the personnel, the infra-red receiver being configured to detect coded infra-red signals transmitted by infra-red transmitters and
wherein each of the vehicle and personnel collision avoidance devices is operable to 1) disable the transmission of proximity warnings if the collision avoidance device determines that the detected context is non-hazardous, 2) cause the transmission of regular proximity warnings if the collision avoidance device determines that the detected context is hazardous, or 3) cause the transmission of critical proximity warnings, different from regular proximity warnings, if the collision avoidance device determines that the detected context is critically hazardous.

24. The collision avoidance system as claimed in claim 23, the collision avoidance devices being further mounted to obstacles, the obstacle collision avoidance devices being configured to transmit proximity warnings to vehicle collision avoidance devices in communication range.

25. A collision avoidance system comprising a plurality of collision avoidance devices mounted to vehicles and persons, the personnel collision avoidance devices being respectively integrated into cap lamps and being configured to transmit proximity warnings to vehicle collision avoidance devices in communication range, and the vehicle collision avoidance devices being configured to transmit proximity warnings to other vehicle collision avoidance devices and to personnel collision avoidance devices in communication range;
wherein each of the vehicle and personnel collision avoidance devices comprises at least one context awareness mechanism configured to detect a context in which the collision avoidance device is, the at least one context awareness mechanism of the personnel collision avoidance devices comprising a movement detector; and
wherein each of the vehicle and personnel collision avoidance devices is operable to 1) disable the transmission of proximity warnings if the collision avoidance device determines that the detected context is non-hazardous, 2) cause the transmission of regular proximity warnings if the collision avoidance device determines that the detected context is hazardous, or 3) cause the transmission of critical proximity warnings, different from regular proximity warnings, if the collision avoidance device determines that the detected context is critically hazardous.

26. The collision avoidance system as claimed in claim 25, the collision avoidance devices being further mounted to obstacles, the obstacle collision avoidance devices being configured to transmit proximity warnings to vehicle collision avoidance devices in communication range.

27. A collision avoidance system comprising a plurality of collision avoidance devices mounted to vehicles and persons, the personnel collision avoidance devices being respectively integrated into cap lamps and being configured to transmit proximity warnings to vehicle collision avoidance devices in communication range, and the vehicle collision avoidance devices being configured to transmit proximity warnings to other vehicle collision avoidance devices and to personnel collision avoidance devices in communication range;
wherein each of the vehicle and personnel collision avoidance devices comprises at least one context awareness mechanism configured to detect a context in which the collision avoidance device is, the at least one context awareness mechanism of the personnel collision avoidance devices comprising a user interface configured to request an emergency stop from all vehicles in proximity; and
wherein each of the vehicle and personnel collision avoidance devices is operable to 1) disable the transmission of proximity warnings if the collision avoidance device determines that the detected context is non-hazardous, 2) cause the transmission of regular proximity warnings if the collision avoidance device determines that the detected context is hazardous, or 3) cause the transmission of critical proximity warnings, different from regular proximity warnings, if the collision avoidance device determines that the detected context is critically hazardous.

28. The collision avoidance system as claimed in claim 27, the collision avoidance devices being further mounted to obstacles, the obstacle collision avoidance devices being configured to transmit proximity warnings to vehicle collision avoidance devices in communication range.

29. A collision avoidance system comprising a plurality of collision avoidance devices mounted to vehicles and persons, the personnel collision avoidance devices being respectively integrated into cap lamps and being configured to transmit proximity warnings to vehicle collision avoidance devices in communication range, and the vehicle collision avoidance devices being configured to transmit proximity warnings to other vehicle collision avoidance devices and to personnel collision avoidance devices in communication range;
wherein each of the vehicle and personnel collision avoidance devices comprises at least one context awareness mechanism configured to detect a context in which the collision avoidance device is, the at least one context awareness mechanism of the personnel collision avoidance devices comprising a cap lamp interface configured to detect an operating status of the light; and wherein each of the vehicle and personnel collision avoidance devices is operable to 1) disable the transmission of proximity warnings if the collision avoidance device determines that the detected context is non-hazardous, 2) cause the transmission of regular proximity warnings if the collision avoidance device determines that the detected context is hazardous, or 3) cause the transmission of critical proximity warnings, different from regular proximity warnings, if the collision avoidance device determines that the detected context is critically hazardous.

30. The collision avoidance system as claimed in claim 29, the collision avoidance devices being further mounted to obstacles, the obstacle collision avoidance devices being configured to transmit proximity warnings to vehicle collision avoidance devices in communication range.

* * * * *